Dec. 9, 1952     A. H. FINE     2,620,663
LIQUID INDICATOR

Filed April 1, 1950

*INVENTOR.*
ALBERT H. FINE

BY *Wallace and Cannon*

ATTORNEYS

Patented Dec. 9, 1952

2,620,663

UNITED STATES PATENT OFFICE 2,620,663

LIQUID INDICATOR

Albert H. Fine, Oak Park, Ill.

Application April 1, 1950, Serial No. 153,368

6 Claims. (Cl. 73—325)

This invention relates to liquid indicators of the kind employed in refrigerating systems, in association with steam boilers and similar instances.

Liquid indicators of the kind to which this invention pertains include metallic nipples through the intermediary of which connection is made to the system or the like with which the indicator is to be used. Such indicators also include transparent glass tubes in which the liquid is to be visible when the indicator is in use. In indicators of this kind, as these have heretofore been constructed, considerable difficulty has been encountered in effecting a tight leak-proof seal between the glass tube and the metallic nipples which are respectively disposed at the ends of the glass tube. This has been particularly true in instances where the indicator has been employed, for example, in association with refrigerating systems, where it will be subjected to a variation in temperatures, and such variations in temperatures will be encountered in many of the other uses to which the indicators may be put.

It is, therefore, the primary object of this invention to effect a leak-proof seal between the sight glass and the nipples at each end thereof in a liquid indicator and to effect this in a novel, efficient and economical manner is another object of this invention.

Another more specific object of this invention is to employ a resilient arrangement for effecting a seal of the aforesaid character and to so arrange such resilient arrangement that it will compensate for any relative movement between the glass and the nipples that may be occasioned, for example, by subjecting the indicator to temperature variations.

A yet further object of the invention is to bond the resilient sealing member to the one end of the glass tube and also to the adjacent nipple so as to thereby afford a leak-proof arrangement.

Other and further objects of the present invention will be apparent from the following description and claims and are illustrated in the accompanying drawing which, by the way of illustration, shows a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 1:
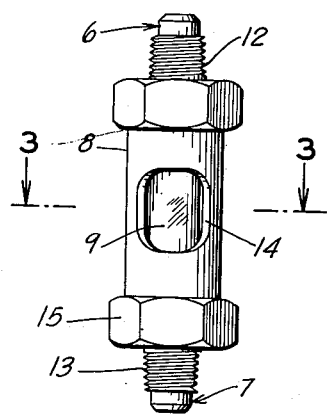
Fig. 1 is an elevational view of a liquid indicator embodying my invention.
Figure 2:
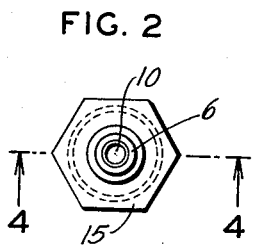
Fig. 2 is a top plan view end of the indicator shown in Fig. 1.
Figure 3:
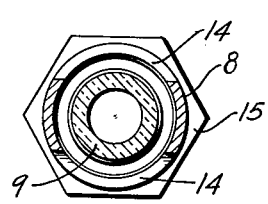
Fig. 3 is a horizontal sectional view taken substantially on the line 3—3 on Fig. 1.

The liquid indicator of the present invention includes a metallic tubular housing 8 which has nipples, generally indicated by 6 and 7, disposed at opposite ends thereof. A glass tube 9 is disposed in the tubular housing 8 to be in communication with the fluid passages 10 and 11 that are provided respectively in the nipples 6 and 7. These nipples are respectively screw-threaded on their outer periphery as indicated at 12 and 13, so as to thereby enable the liquid indicator to be connected in a system or the like with which the indicator is to be employed to indicate liquid flow, level or other condition in the system or the like. The housing 8 has openings as 14 formed therein in diametrical opposed relation, as best shown in Fig. 3, to enable the glass tube 9 to be observed therethrough.

Figure 4:
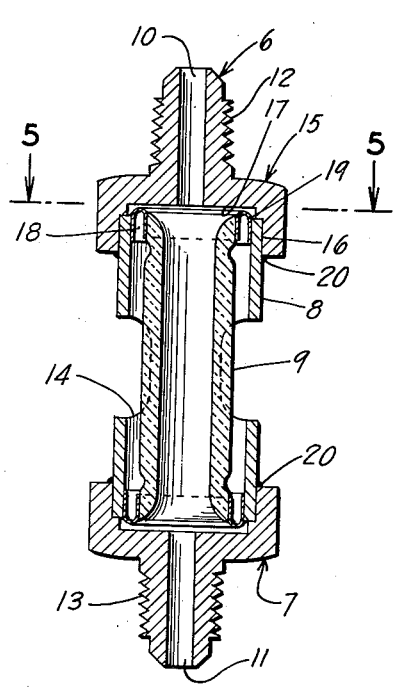
Fig. 4 is a vertical sectional view taken substantially on the line 4—4 on Fig. 2.
Figure 5:
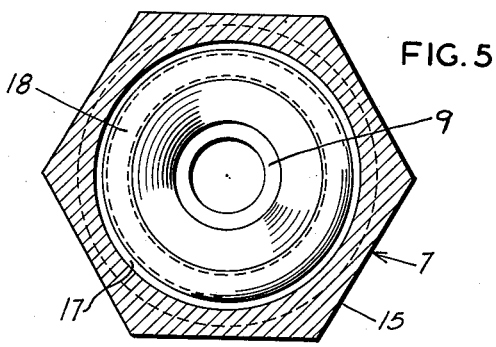
Fig. 5 is a horizontal sectional view, drawn to an enlarged scale, taken on the line 5—5 on Fig. 4.

Since the fluid that will flow through the passages 10 and 11 and the glass tube 9 will usually be under pressure, it is essential that a leak-proof interconnection be afforded between the ends of the glass tube and the portions of the nipples in which the glass tube is disposed. Thus, each nipple includes a polygonal-shaped body as 15 that is larger than the screw-threaded portion of the nipple. A recess 16 is formed in the body 15 at the end thereof opposite the screw-threaded portion and, as best shown in Fig. 4, one end of the housing 8 is disposed in this recess. Another recess 17, smaller than the recess 16, is formed in the head 15 and one end of the glass tube 9 is extended into this recess 17 to terminate in spaced relation with the bottom wall of the recess. An arrangement such as that just described is provided at each of the respective ends of the tubular housing 8 and the glass tube 9.

In the present instance a resilient sealing member 18 is disposed between the adjacent marginal end portions of the housing 8 and the tube 9, there being such a sealing member at each end of this housing and tube. As best shown in Fig. 4, each sealing member 18 is substantially U-shaped in cross-section and is disposed with the bight thereof slightly beyond the adjacent end of the glass tube 9.

It is essential that the sealing member 18 and the glass tube 9 have substantially equivalent coefficients of expansion inasmuch as one limb of each sealing member is firmly bonded, in any suitable manner, to the adjacent marginal end of the glass tube 8. A continuous bond is afforded, as by fusion, between the members 9 and 18 to insure against leakage. If the members 9 and 18 did not expand and contract at least substantially equally, when subjected to temperature variations, the bond therebetween would be broken by the resultant unequal expansion or contraction. Therefore, the sealing member 18 may be formed of a Kovar alloy and a Corning type No. 7052 glass tube may be employed, since such alloy and glass have at least substantially equal coefficients of expansion. It will be understood, however, that any glass and metal whose coefficients of expansion are suitable to permit them being bonded together without separation when subjected to a wide range of temperature variations may be employed. The Kovar alloy that is employed in the present instance is composed principally of 29% nickel, 17% cobalt and the balance iron. The glass of aforesaid type No. 7052 tube is a hard borosilicate glass. Moreover, the configuration of the sealing member 18 and the resiliency thereof also permit relative movement without breakage of the bonds as would cause leakage.

Figure 6:
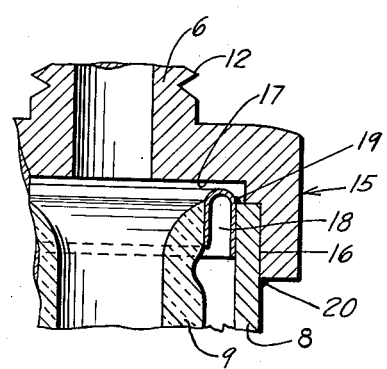
Fig. 6 is a fragmentary detail view, drawn to an enlarged scale, of the novel sealing arrangement of the present invention.

In assembling the liquid indicator of the present invention, one limb of a resilient member 18 is firmly bonded to a marginal end portion of the glass tube as 9. This tube is then inserted into the housing 8 in such a maner that the free limb of the sealing member 18 bears against the inner periphery of the tube 8 adjacent the end thereof. Then by brazing, soldering or the like, as indicated at 19, the resilient sealing member 18 is firmly joined to the housing 8, a continuous bond being used so as to thereby insure against leakage between the members 18 and 8. As best shown in Fig. 6, the arrangement is preferably such that the bight of the sealing member 18 is disposed outwardly of the adjacent ends of the glass tube 9 and the housing 8.

After an interconnection between the ends of the glass tube 9 and the housing 8 has been effected through the resilient sealing members 18, the end portions of the tubular housing 8 are inserted into the recesses at 16 in the nipple heads as 15. Then by brazing, soldering or the like, a firm interconnection is made between the housing 8 and the body 15, as indicated at 20. Here again a continuous bond is afforded so as to insure against leakage between the members 8 and 15.

When my novel indicator is to be connected in a system it will be advantageous to engage the polygonal head 15 of a nipple as 6 or 7 with a wrench or the like so that, when connection is made to the screw-threaded portion of the nipple, the aforesaid bonds will not be subjected to strains such as might tend to break the same. It will, of course, be understood that the screw-threaded portions of the nipples may be supplanted by other connecting means such, for example, as would enable sweated connections to be made to the nipples.

It will be apparent from the foregoing that the liquid indicator of the present invention is leak-proof since each sealing member 18 is firmly bonded to the glass tube 9 and the housing 8, and the housing 8 is firmly bonded to each head as 15 of the nipples 6 and 7. Moreover, since the glass tube and the sealing member are formed of materials having at least substantially equal coefficients of expansion, the bond therebetween will not be broken in the event of expansion or contraction of the glass tube, such as might be occasioned by temperature variations in the fluid flowing through the tube. Of course, as is customary, the housing 8 and the nipples 6 and 7 will be formed of at least substantially like material, such as brass, so as to insure that there will not be relative movement between these elements in the event of temperature fluctuations so that here again the bond between the elements will not be broken because of temperature variations. The U-shaped configuration of the resilient sealing member 18 permits longitudinal and transverse movement which also insures against breakage of the bonds.

Hence, the novel liquid indicator of the present invention enables the hereinabove set forth and kindred objects of the present invention to be realized. However, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A liquid indicator including a tubular housing having at least one sight opening therein, a transparent tube disposed in said housing, a pair of nipples each having a recess therein into which, respectively, adjacent ends of said housing and tube are extended, and resilient U-shaped sealing members respectively interposed between the facing side end portions of the tube and housing, the links of said sealing members being firmly bonded to the said facing side end portions of the tube and housing by a continuous bond to insure against leakage, said housing being firmly bonded to said nipples by a continuous bond to insure against leakage.

2. A liquid indicator including a tubular housing having at least one sight opening therein, a transparent tube disposed in said housing, the adjacent facing side end portions of said housing and tube being spaced apart from each other, and a substantially U-shaped resilient sealing member interposed in the space afforded between the facing side end portions of said tube and housing at each of the ends thereof, one limb of each sealing member being extended for a substantial distance in contact with and being firmly bonded by a continuous bond to the adjacent end portion of the tube, the other limb of the sealing member being extended for a substantial distance in contact with and being firmly bonded to the adjacent end of the housing by a continuous bond, the continuous bonds insuring against leakage of fluid from the indicator at the open ends thereof.

3. A liquid level indicator adapted to be connected with an intermediate portion of a conduit comprising a transparent tube through which a liquid level therein may be viewed, which tube is completely surrounded at its opposite ends by a sleeve-like member the inner facing side portion of which is spaced apart from and extended parallel with the corresponding outer-facing side portion at the end of said tube, sealing members adapted to prevent leakage at the opposite open ends of said tube, said sealing members each being in the form of U-shaped annular rings having parallel spaced-apart depending limbs interposed in the space afforded between said side portions, each of the depending limbs of each of the U-shaped sealing members being bonded to and extended for a substantial distance in contact with the respective side portions of said tube and said sleeve-like member whereby the space therebetween at either end of said tube is sealed against leakage and said tube is free to expand and contract within said space, said tube and said sealing member having substantially equal coefficients of expansion.

4. A liquid level indicator according to claim 3 in which the channels of said U-shaped sealing rings open toward one another.

5. In a liquid indicator including a transparent tube for observing liquid levels and a sleeve having a sight opening surrounding the tube, a resilient U-shaped annular sealing member having substantially parallel depending limbs interposed at the opposite ends of the tube between the corresponding parallel facing side portions of the tube and the sleeve surrounding the tube, each of said sealing members being securely attached to said portions of the tube and sleeve to assure against leakage and to assure freedom of contraction and expansion of said tube relative to said sleeve.

6. In a liquid indicator including a sight glass for observing liquid levels, a tubular housing surrounding said sight glass and having a sight opening therein for viewing said sight glass, a pair of nipples each having a recess therein into which, respectively, adjacent ends of said housing and sight glass are extended, and resilient substantially U-shaped sealing member having parallel spaced-apart depending limbs interposed between the sight glass and the adjacent portion of said tubular housing at each end of said sight glass, one limb of each sealing member being bonded to the outer side of each end portion of the sight glass, and the other limb of each sealing member being bonded to the inner side of the adjacent portion of the tubular housing, each of said bonds being continuous to assure against leakage between the sight glass and the tubular housing.

ALBERT H. FINE.

REFERENCES CITED

The following references are of record in the file of this patent:

UNITED STATES PATENTS

| Number | Name | Date |
|---|---|---|
| 419,743 | Worthington | Jan. 21, 1890 |
| 2,019,478 | Bueckermann | Nov. 5, 1935 |
| 2,053,765 | Dana | Sept. 8, 1936 |

FOREIGN PATENTS

| Number | Country | Date |
|---|---|---|
| 257,414 | Germany | Mar. 5, 1913 |